US008868968B2

(12) United States Patent
Sekiguchi et al.

(10) Patent No.: US 8,868,968 B2
(45) Date of Patent: Oct. 21, 2014

(54) PARTIAL FAULT PROCESSING METHOD IN COMPUTER SYSTEM

(75) Inventors: Tomoki Sekiguchi, Sagamihara (JP); Hitoshi Ueno, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 13/453,049

(22) Filed: Apr. 23, 2012

(65) Prior Publication Data

US 2012/0272091 A1 Oct. 25, 2012

(30) Foreign Application Priority Data

Apr. 25, 2011 (JP) .................................. 2011-096689

(51) Int. Cl.
*G06F 11/00* (2006.01)
*G06F 11/07* (2006.01)
*G06F 11/20* (2006.01)

(52) U.S. Cl.
CPC ........ *G06F 11/0793* (2013.01); *G06F 11/0712* (2013.01); *G06F 11/2038* (2013.01); *G06F 11/2028* (2013.01)
USPC ........................................................ 714/6.12

(58) Field of Classification Search
CPC . G06F 9/5077; G06F 17/30855; G06F 21/53; G06F 21/6218; G06F 21/629; G06F 2221/2149; G06F 3/1415; G06F 3/1438; G06F 3/1462; G06F 9/45533; G06F 9/485; G06F 9/5027; G06F 9/5055; G06F 9/5088
See application file for complete search history.

(56) References Cited

U.S. PATENT DOCUMENTS

| 7,134,052 | B2* | 11/2006 | Bailey et al. ..................... 714/44 |
| 7,487,390 | B2* | 2/2009 | Saika ............................... 714/13 |
| 7,802,127 | B2* | 9/2010 | Katano et al. ..................... 714/3 |
| 7,992,032 | B2* | 8/2011 | Baba et al. ........................ 714/3 |
| 2006/0224931 | A1* | 10/2006 | Moriki et al. ..................... 714/53 |
| 2006/0294337 | A1* | 12/2006 | Hartung et al. ................ 711/173 |
| 2007/0011495 | A1 | 1/2007 | Armstrong et al. |
| 2008/0162983 | A1* | 7/2008 | Baba et al. ........................ 714/3 |
| 2008/0263390 | A1* | 10/2008 | Baba et al. ........................ 714/4 |
| 2009/0144731 | A1 | 6/2009 | Brown et al. |
| 2010/0017643 | A1* | 1/2010 | Baba et al. ........................ 714/3 |
| 2011/0022887 | A1* | 1/2011 | Hatta et al. ..................... 714/5.1 |
| 2012/0204175 | A1* | 8/2012 | Hatta et al. ........................ 718/1 |
| 2012/0222029 | A1* | 8/2012 | Watanabe et al. ................. 718/1 |
| 2013/0007743 | A1* | 1/2013 | Sekiguchi et al. ................ 718/1 |
| 2014/0059302 | A1* | 2/2014 | Hayakawa et al. ........... 711/153 |

* cited by examiner

*Primary Examiner* — Amine Riad
(74) *Attorney, Agent, or Firm* — Volpe and Koenig, P.C.

(57) ABSTRACT

As regards a hardware fault which has occurred in a computer, a hypervisor notifies an LPAR which can continue execution, of a fault occurrence as a hardware fault for which execution can be continued. Upon receiving the notice, the LPAR notifies the hypervisor that it has executed processing to cope with a fault. The hypervisor provides an interface for acquiring a situation of a notice situation. It is made possible to register and acquire a situation of coping with a hardware fault allowing continuation of execution through the interface, and it is made possible to make a decision as to the situation of coping with a fault in the computers as a whole.

11 Claims, 11 Drawing Sheets

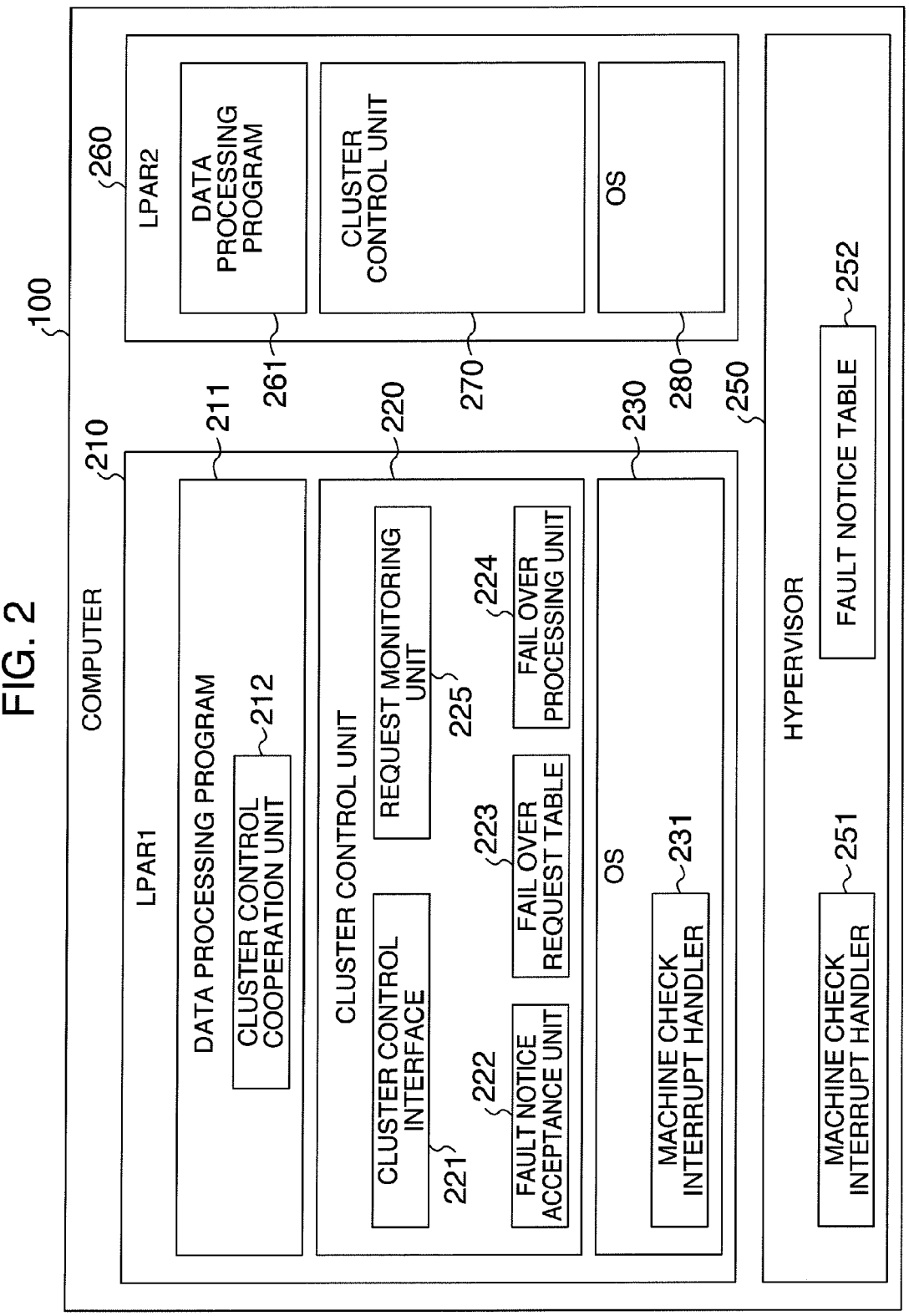

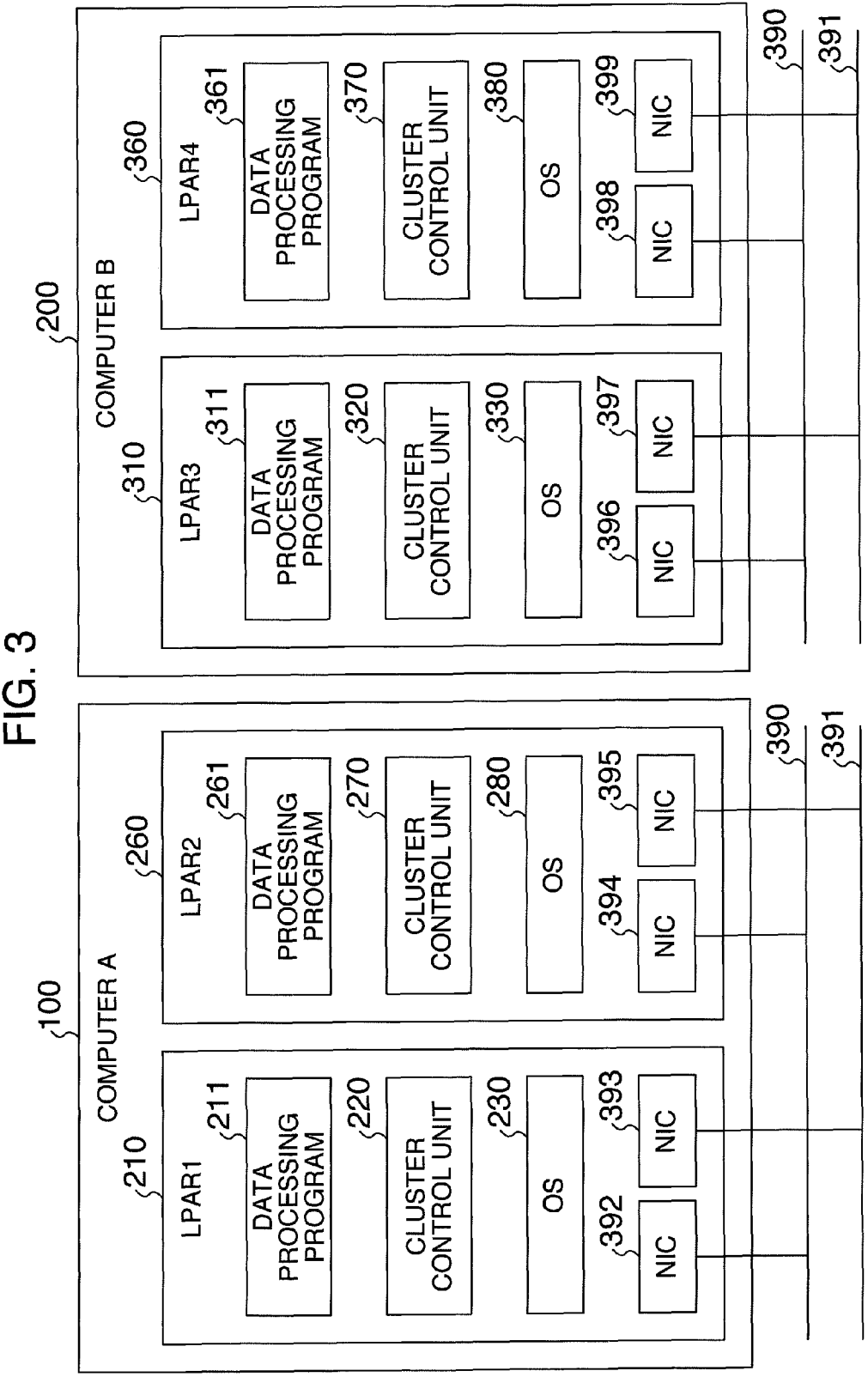

FIG. 4

FAULT NOTICE TABLE  252

| LPAR | FAULT NOTICE REQUEST FLAG | FAULT NOTICE FLAG | STOP POSSIBILITY FLAG |
|---|---|---|---|
|  |  |  |  |
|  |  |  |  |

401  402  403  404

FAULT NOTICE TABLE
(CONTENTS AT TIME WHEN STARTING LPAR)  410

| LPAR | FAULT NOTICE REQUEST FLAG | FAULT NOTICE FLAG | STOP POSSIBILITY FLAG |
|---|---|---|---|
| LPAR1 | NOT REQUESTING | NOT PRESENT | NO |
| LPAR2 | NOT REQUESTING | NOT PRESENT | NO |

FAULT NOTICE TABLE (TABLE IN COMPUTER 100 (A))  420

| LPAR | FAULT NOTICE REQUEST FLAG | FAULT NOTICE FLAG | STOP POSSIBILITY FLAG |
|---|---|---|---|
| LPAR1 | REQUESTING | NOT PRESENT | NO |
| LPAR2 | REQUESTING | NOT PRESENT | NO |

FAULT NOTICE TABLE (TABLE IN COMPUTER 200 (B))  430

| LPAR | FAULT NOTICE REQUEST FLAG | FAULT NOTICE FLAG | STOP POSSIBILITY FLAG |
|---|---|---|---|
| LPAR3 | REQUESTING | NOT PRESENT | YES |
| LPAR4 | REQUESTING | NOT PRESENT | YES |

FAULT PROCESSING SITUATION

COMPUTER A 　1001　　1002　　1003　　1004

| LPAR NAME | OPERATION SITUATION | FAULT NOTICE | STOP POSSIBILITY |
|---|---|---|---|
| LPAR1 | IN EXECUTION | PRESENT | POSSIBLE |
| LPAR2 | STOP | — | — |

COMPUTER B 　1011　　1012　　1013　　1014

| LPAR NAME | OPERATION SITUATION | FAULT NOTICE | STOP POSSIBILITY |
|---|---|---|---|
| LPAR3 | IN EXECUTION | NOT PRESENT | IMPOSSIBLE |
| LPAR4 | IN EXECUTION | NOT PRESENT | IMPOSSIBLE |

FIG. 11

FAIL OVER REQUEST TABLE　　　　223

| REQUEST FLAG | REQUESTING | 1110 |
|---|---|---|
| UNCOMPLETED REQUEST FLAG | NOT REQUESTING | 1111 |

FIG. 12

FAULT NOTICE TABLE IN COMPUTER 200(B)
(LPAR4 IN COMPUTER B MAKES TRANSITION TO
PRIMARY NODE DUE TO FAIL OVER)                                    440

| LPAR | FAULT NOTICE REQUEST FLAG | FAULT NOTICE FLAG | STOP POSSIBILITY FLAG |
|---|---|---|---|
| LPAR3 | REQUESTING | NOT PRESENT | YES |
| LPAR4 | REQUESTING | NOT PRESENT | NO |

FAULT NOTICE TABLE IN COMPUTER 100(A)
(AFTER STOP OF LPAR2 AND FAULT NOTICE TO LPAR1)   450

| LPAR | FAULT NOTICE REQUEST FLAG | FAULT NOTICE FLAG | STOP POSSIBILITY FLAG |
|---|---|---|---|
| LPAR1 | REQUESTING | PRESENT | NO |
| LPAR2 | REQUESTING | PRESENT | YES |

FAULT NOTICE TABLE IN COMPUTER 100(A)
(AFTER LPAR2 STOPS AND LPAR1 MAKES TRANSITION TO
BACKUP NODE DUE TO FAIL OVER)                                   460

| LPAR | FAULT NOTICE REQUEST FLAG | FAULT NOTICE FLAG | STOP POSSIBILITY FLAG |
|---|---|---|---|
| LPAR1 | REQUESTING | PRESENT | YES |
| LPAR2 | REQUESTING | PRESENT | YES |

FAULT NOTICE TABLE IN COMPUTER 200(B)
(LPAR3 IN COMPUTER B ALSO MAKES TRANSITION TO
PRIMARY NODE DUE TO FAIL OVER)                                   470

| LPAR | FAULT NOTICE REQUEST FLAG | FAULT NOTICE FLAG | STOP POSSIBILITY FLAG |
|---|---|---|---|
| LPAR3 | REQUESTING | NOT PRESENT | NO |
| LPAR4 | REQUESTING | NOT PRESENT | NO |

PARTIAL FAULT PROCESSING METHOD IN COMPUTER SYSTEM

INCORPORATION BY REFERENCE

The present application claims priority from Japanese application JP2011-096689 filed on Apr. 25, 2011, the content of which is hereby incorporated by reference into this application.

BACKGROUND OF THE INVENTION

The present invention relates to a processing method for a partial fault in a computer system in which a plurality of LPARs (Logical PARtitions) are executing owing to logical partitioning.

As methods for utilizing a computer effectively, there are virtualization and logical partitioning. According to these techniques, virtual computers can be constituted on one physical computer and consequently the capability of the physical computer can be utilized effectively. As the computer performance is improved, it becomes possible in inexpensive computers as well to utilize the virtualization and logical partitioning and they are widely used.

Each computer has various hardware fault detection mechanisms. The computer detects an abnormality in its components, and notifies software such as an OS or a hypervisor of the fault by means of an interrupt. In general, an interrupt which notifies of a fault is called machine check interrupt. The OS or the hypervisor can stop the whole computer or only a part relating to the fault which has occurred, depending upon contents of the fault notified of by means of the machine check.

A computer which supports the logical partitioning notifies only an LPAR affected by a hardware fault which has occurred, of the machine check. Only the LPAR notified of the machine check can stop execution. LPARs which do not utilize the component in which the fault has occurred can execute continuously. For example, U.S. Pat. No. 7,134,052 B2, Bailey et al. discloses a method for identifying an LPAR relating to a fault which has occurred in a device of a computer, at the time of execution and transmitting a machine check only to that LPAR. In principle, similar fault processing is possible in the virtualization as well.

As a technique for constituting a computer system in which data loss and processing interruption are not allowed, there is the cluster technique. In a cluster system, a back up computer is prepared against stop of a computer due to a fault. The primary computer (primary node) which executes data processing and the backup computer (backup node) monitor the operation state each other. If the data processing in the primary node has stopped, the backup node takes over the data processing. This taking over processing is called failover. In general, these kinds of control are executed by software called cluster management software which executes in the primary node and the backup node.

A highly reliable system can be configured by combining the hardware fault processing in the logical partitioning with the cluster configuration. In this case, the cluster management software which executes in an LPAR relating to a hardware fault executes failover and causes an LPAR in a backup node which is on standby in another computer to continue data processing which has been executed in the LPAR relating to the hardware fault. On the other hand, LPARs which are not affected by the fault continue to execute data processing as it is. Such a technique is disclosed in U.S. Pat. No. 7,802,127 B2, Katano et al.

Hardware in which a fault has occurred needs to be replaced sooner or later. In general, in the case where a cluster is configured, an application, a virtual computer, and an LPAR which are executing as the primary node in a computer mounting defective hardware are failed over manually to a computer in the backup node in the cluster, then a computer which has executed the virtual computer or LPAR in the primary node is stopped, and hardware is replaced. An operator which executes maintenance makes a decision by some means whether the fault node can be stopped and whether fault node is not executing some data processing, and executes operation for stopping the fault node.

SUMMARY OF THE INVENTION

When a hardware fault has occurred in the case where the logical partitioning is utilized, it is possible to stop only an LPAR affected by the hardware fault and continue execution in other LPARs. On the other hand, if the whole computer must be stopped when replacing a defective part, a decision must be made at the time of the maintenance whether running LPARs can be stopped, resulting in a problem. In general, LPARs execute respective applications which are unrelated to each other, and consequently it is not easy to make a decision whether an application can be stopped. Furthermore, even if an application can be stopped, the operator must operate manually, resulting in a problem of occurrence of possibility of an operation mistake.

In the case of the cluster configuration as well, similar problems occur. In the cluster configuration in the case where logical partitioning is not utilized, the operation mode of a physical computer is either primary or backup and it is possible to see visually with ease. As a result, the operator who executes maintenance can see the operation state of the computer easily and stop the computer safely.

On the other hand, if logical partitioning is adopted and each LPAR is configured as a cluster system, then each clustered LPAR which affected by the fault failovers at the time of a hardware fault and an LPAR of primary node and an LPAR of backup node are present mixedly in one physical computer. For understanding the execution state of the physical computer, therefore, it is necessary to refer to states of a plurality of LPARs, resulting in a problem of complicated operation.

Furthermore, it is necessary for the operator to failover an LPAR which has been the primary node by the time of the maintenance. It becomes necessary to refer to states of a plurality of LPARs and conduct manual operation to the LPAR of primary node which is executing data processing. Therefore, the operator who executes them is burdened with a task of always taking greatest care to make a decision and conduct operation correctly.

In order to solve the problems, according to the present invention, hardware fault processing described hereafter is conducted for a virtual computer system having a plurality of LPARs generated on physical computers constituting clusters, under control of hypervisors. In other words, if a hardware fault occurs in the first physical computer, a first hypervisor in the first physical computer makes a decision whether there is an LPAR which can continue execution, as regards LPARs generated on the first physical computer. If there is an LPAR which cannot continue execution, then the first hypervisor stops a first LPAR which cannot continue execution and a cluster control unit in a second LPAR which constitutes a cluster with the first LPAR and which is generated on the second physical computer conducts first failover to failover the application of the first LPAR to the second LPAR. If there is an LPAR which can continue execution, then a cluster control unit in a fourth LPAR which constitutes a cluster with a third LPAR capable of continuing execution and which is generated on the second physical computer conducts second failover to failover the application of the third LPAR to the fourth LPAR.

By the way, if the second failover is completed, then a cluster control unit in the third LPAR may set a stop possibility for the third LPAR in fault notice information the first hypervisor has, after the second failover to "possible."

Furthermore, in physical computers having a plurality of LPARs generated on them under control of hypervisors and constituting clusters, the hypervisors have fault notice information, the fault notice information manages whether there is a request of a fault notice from every LPAR and whether the LPAR can be stopped after failover, as regards a hardware fault which does not affect execution of the LPARs. Upon occurrence of a hardware fault, the hypervisor refers to the fault notice information, transmits a fault notice to an LPAR which requests a notice of a hardware fault, and makes a decision whether there is an LPAR which can continue execution among the plurality of LPARs. In the presence of an LPAR which cannot continue execution, the hypervisor stops a first LPAR which cannot continue execution and the first LPAR is failovered to a second LPAR which constitutes a cluster with the first LPAR. In the presence of an LPAR which can continue execution, a third LPAR which can continue execution is failovered to a fourth LPAR which constitutes a cluster with the third LPAR. Upon completion of the failover of the LPARs, a cluster control unit in the LPAR which has received the fault notice sets stop possibility for the LPAR in the fault notice information after failover to "possible."

According to the present invention, it is recorded in fault notice information whether an LPAR can be stopped after the failover. Therefore, it becomes possible for an operator to make a decision easily at the time of maintenance after occurrence of a partial hardware fault whether a computer is in a state in which maintenance work can be executed.

A hypervisor provides an interface for an LPAR which has received a notice of a hardware fault allowing continuation of execution to notify that the LPAR has executed the fault processing upon the notice. The hypervisor retains the notification situation of the fault processing of the LPAR. The hypervisor provides an interface for acquiring the notification situation. Therefore, it is made possible to register and acquire the situation of the fault processing through these interfaces, and it is made possible to make a decision as to the situation of coping with a fault in the computer as a whole.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing a configuration of a computer in embodiments of the present invention;

FIG. 3 is a diagram showing a configuration of a computer system in an embodiment of the present invention;

FIG. 4 is a diagram showing a structure of data retained by a hypervisor and a cluster control unit in an embodiment of the present invention;

FIG. 10 is a diagram showing a system management screen in an embodiment of the present invention;

FIG. 11 is a diagram showing a structure of a failover request table; and

FIG. 12 is a diagram showing states of a fault notice table.

DESCRIPTION OF THE EMBODIMENTS

<Embodiment 1>

Figure 1:
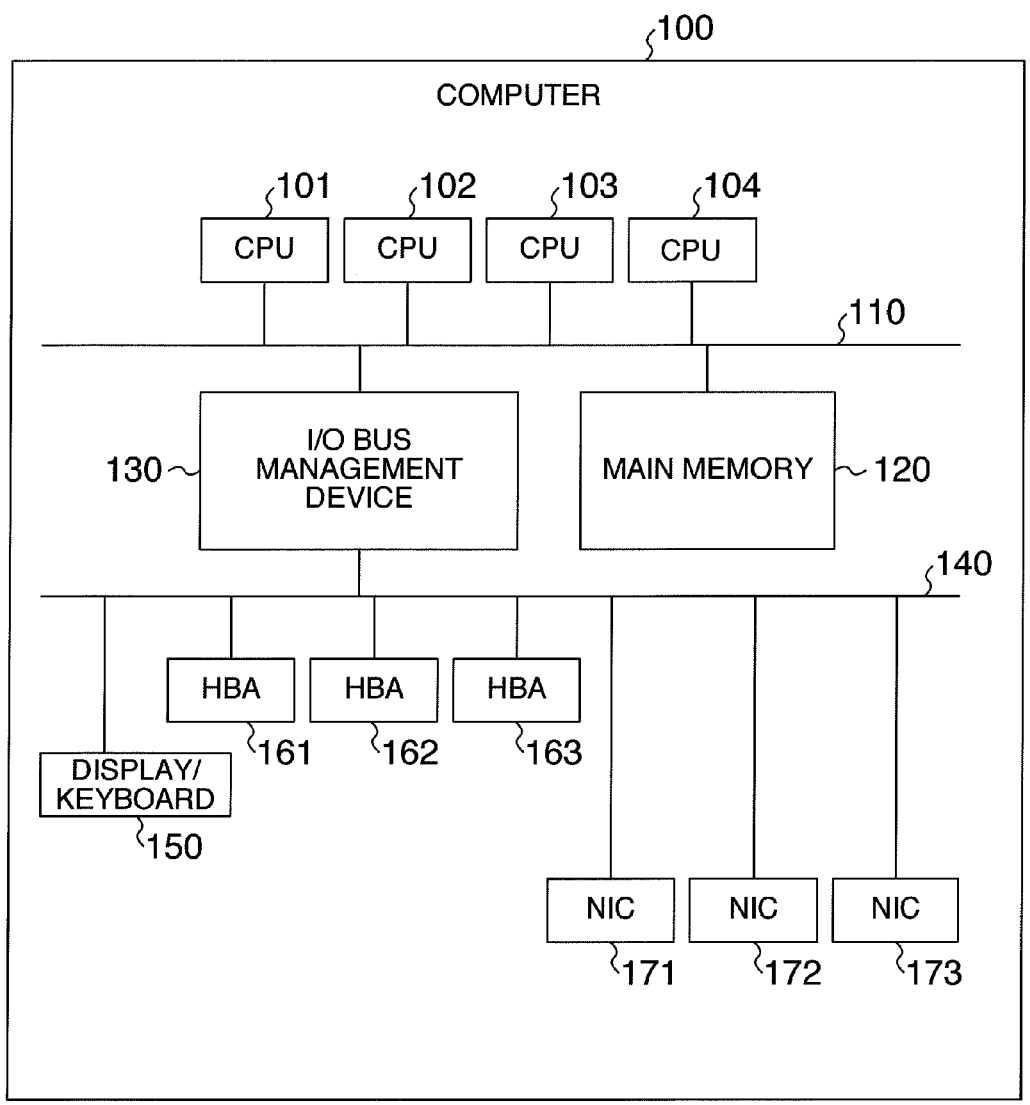
FIG. 1 is a diagram showing a configuration of a computer in embodiments of the present invention.

A computer system according to the present invention will now be described with reference to the drawings.

FIG. 3 is a diagram showing a configuration of a computer system according to embodiment 1 of the present invention. LPARs 210 and 310 executing in a computer 100 and a computer 200 constitute a cluster, and LPARs 260 and 360 executing in the computer 100 and the computer 200 constitute another cluster. It is supposed that the computer 100 is denoted by computer A and the computer 200 is denoted by computer B. It is supposed that in the computer 100 the LPAR 210 is LPAR1 in LPAR name and the LPAR 260 is LPAR2 in LPAR name. It is also supposed that in the computer 200 the LPAR 310 is LPAR3 in LPAR name and the LPAR 360 is LPAR4 in LPAR name. Furthermore, it is supposed that the LPAR 210 and the LPAR 260 constitute primary nodes in the clusters and the LPAR 310 and the LPAR 360 constitute backup nodes in the clusters.

In the computer 100, the LPARs 210 and 260 are constituted by a hypervisor 250 (not illustrated in FIG. 3) to execute. The hypervisor 250 is implemented as software which executes in a CPU in the computer 100 or hardware in the computer 100. In FIG. 3, the hypervisor 250 is shown to assign logical NICs 392 and 393 to the LPAR 210 and assign NICs 394 and 395. Other LPARs are assigned logical NICs in the same way.

A software configuration will now be described by taking the LPAR 210 and the LPAR 310 included in the cluster as an example. In the LPAR 210, an OS 230, a cluster control unit 220 and a data processing program 211 are executed. The same is true of the LPAR 310 as well. The cluster control unit 220 in the LPAR 210 and a cluster control unit 320 in the LPAR 310 monitor operation situations each other via a network 390. Under control of the cluster control units 220 and 320, a data processing program is executed in a LPAR which is executing as the primary node. For example, if the LPAR 210 is the primary node, the data processing program 211 executes actual processing.

If the LPAR 210 stops execution due to a fault, then the cluster control unit 320 in the LPAR 310 detects an abnormality in the LPAR 210, executes failover, and starts execution of a data processing program 311 (thereafter, the LPAR 210 becomes the backup node). The data processing programs 211 and 311 transmit and receive a processing request and a result via a network 391.

In the foregoing description, execution of the data processing program is started. Depending upon the configuration of the cluster, data processing is being executed in the backup node as well, but the backup node is not executing actual output. In this case, the cluster control unit exercises control in failover to cause the data processing program 311 to start actual processings.

The LPAR 260 and the LPAR 360 also constitute a similar cluster. Furthermore, although not illustrated in FIG. 3, resources such as a main memory, a CPU, and a storage device required to execute the data processing program are also subject to logical partitioning and assigned to respective LPARs.

FIG. 1 shows a structure of the computer 100 which constitutes clusters in embodiments of the present invention. Although shown as a configuration of the computer 100, other computers also have a similar configuration. In the computer 100, CPUs 101 to 104, a main memory 120, an I/O bus management device 130 are connected to each other via a bus 110. An input/output device 150 such as a display or a keyboard, HBAs (Host Bus Adapters) 161 to 163 for connection to an external storage device, and NICs (Network Interface Adapters) 171 to 173 for connection to a network are connected an I/O bus 140 to which the I/O bus management device 130 is connected. In this example, three HBAs and three NICs are shown. However, the number of the HBAs and the number of the NICs are not restricted to three, but as many HBAs and NICs as required to constitute a system are mounted.

The CPUs 101 to 104 read a program into the main memory 120, execute the program which is read into the main memory 120, and execute various kinds of processing. In the ensuing description, this is represented by description that the program or processing executes.

Each of components in the computer 100 has an abnormality detection function. For example, the CPUs 101 to 104 can detect a failure of a part of an internal cache, a failure of an internal core, and a failure of an internal register. Upon detecting such an internal fault, the CPUs 101 to 104 generate a machine check interrupt and notify software of an abnormality.

The main memory 120, the I/O bus management device 130, the HBAs 161 to 163, and the NICs 171 to 173 also have a similar function. In the case of a fault in the main memory 120, the machine check interrupt is transmitted to any or all of the CPUs 101 to 104 via a device which manages the main memory 120. If the HBAs 161 to 163 and the NICs 171 to 173 detect an abnormality, the I/O bus management device 130 transmits the machine check interrupt.

FIG. 2 is a diagram showing a configuration of software in the computer in the embodiments of the present invention. The configuration of software will now be described by taking the computer 100 as an example. The computer 100 is executing the hypervisor 250. The hypervisor 250 logically divides resources of the computer 100 and is executing the LPAR 210 and the LPAR 260. Divided resources are the CPUs 101 to 104, the main memory 120, the HBAs 161 to 163, and the NICs 171 to 173. The LPAR 210 and the LPAR 260 are executing respectively by utilizing resources provided by the hypervisor 250. The hypervisor 250 includes a machine check interrupt processing handler 251 and a fault notice table 252 which process a machine check interrupt transmitted from a component included in the computer 100.

A configuration of the fault notice table 252 is shown in FIG. 4. For each of LPARs executed on the hypervisor 250, the table 252 retains an LPAR name 401, a flag (a fault notice request flag 402) indicating whether the LPAR is requesting a notice of a hardware fault which does not affect the LPAR, a flag (a fault notice flag 403) indicating whether there is a past hardware fault, and a flag (a stop possibility flag 404) indicating whether a fault processing is completed in the LPAR after a notice of a hardware fault and a state in which the LPAR can be stopped is brought.

The hypervisor 250 provides the LPAR 210 with an interface for setting the fault notice request flag 402 and the stop possibility flag 404 so as to be utilizable from the OS 230. When starting an LPAR, the hypervisor 250 assigns an entry for the LPAR in the table 252, and sets a value indicating "not requesting" into the fault notice request flag 402, a value indicating "not present" into the fault notice flag 403, and a value indicating "no" into the stop possibility flag 404. Contents of the table at this time are shown in 410 in FIG. 4.

A configuration in an LPAR will now be described by taking the LPAR 210 as an example. In the LPAR 210, the OS 230 is executing. The OS 230 includes a machine check interrupt processing handler 231 which processes a logical machine check interrupt transmitted by the hypervisor. The OS 230 has an interface to notify a program executed in the OS 230 that a machine check interrupt is received. The program can receive a notice that the machine check interrupt is received, via the interface.

The LPAR 210 constitutes a cluster with the LPAR 310. The LPAR 210 is executing the OS 230. On the OS 230, the cluster control unit 220 is executing. The cluster control unit 220 executes mutual monitoring and failover processing between the primary node and the backup node. The cluster control unit 220 includes a fault notice acceptance unit 222 which accepts a notice that a hardware fault is occurring from the OS 230, a failover request table 223 for managing failover requests, a failover processing unit 224 which executes failover, a request monitoring unit 225 which schedules failover processing, and a cluster control interface 221 which provides the data processing program 211 which executes in the cluster with information such as the cluster state and a failover interface.

When starting a cluster processing, the cluster control unit 220 sets the fault notice request flag 402 to "requesting" and sets the stop possibility flag 404 to "no" to notify the LPAR of a hardware fault through the interface provided by the hypervisor 250. A state in the fault notice table 252 at a time point when a cluster control unit 270 in the LPAR 260 is also executing is shown in 420 in FIG. 4.

The cluster control unit 320 in the LPAR 310 serving as the backup node sets the stop possibility flag 404 to "yes." The setting in the stop possibility flag 404 is setting indicating that the primary node which is executing a data processing program must not be stopped, but the primary node may be stopped. States in the fault notice table 252 at a time point when a cluster control unit 370 in the LPAR 360 is also executing are shown in 430 in FIG. 4. Here, a state in which the LPAR3 and the LPAR4 serve as the backup node is shown.

Each of the cluster control units 220 and 320 changes the stop possibility flag 404 in the fault notice table 252 from "yes" to "no" when the operation mode of the LPAR which execute under the control of the cluster control unit makes transition from the backup node to the primary node. Each of the cluster control units 220 and 320 changes the stop possibility flag 404 in the fault notice table 252 from "no" to "yes" when the operation mode make transition from the primary node to the backup node.

FIG. 11 shows a structure of the failover request table 223 in the cluster control unit 220. The failover request table 223 retains a value (a request flag 1110) indicating whether a request to execute failover is received and a value (an uncompleted request flag 1111) indicating whether there is an unprocessed failover request. The data processing program 211 or another program can set these flags through the cluster control interface 221. Furthermore, the failover processing unit 224 and the request monitoring unit 225 also operate these flags.

The data processing program 211 is an application which executes on the cluster. If the LPAR 210 stops execution due to a fault when the LPAR 210 is the primary node, the processing of the program 211 is taken over by the LPAR 310 in the computer 200. At this time, the cluster control unit 320 exercises control to cause the LPAR 310 which has taken over the processing to become the primary node.

The other LPAR 260 also has a similar configuration (not illustrated). A data processing program 261 may be a program which executes independently of the program 211 executing in the LPAR 210. Furthermore, the LPARs 310 and 360 in the computer 200 also have similar configurations.

Supposing a hardware fault has occurred in the computer 100 in the system shown in FIG. 3, a hardware fault processing method in the present embodiment will now be described. It is now supposed that the LPARs 210 and 260 which execute in the computer 100 serve as the primary node and the LPARs 310 and 360 which execute in the computer 200 serves as the backup node. Hereafter, operation in the LPAR 210 will be described. However, other LPARs also execute similar operations.

First, operation of the cluster control unit 220 will be described. When starting a cluster, the cluster control unit in each of LPARs which constitute the cluster registers in the OS to be notified of a machine check interrupt which indicates occurrence of a hardware fault. If the LPAR is the LPAR 210, the cluster control unit 220 requests the OS 230 to notify it of a machine check interrupt (its flow is not illustrated).

During the operation of the LPAR 210, the cluster control unit 220 controls execution of the data processing program 211 which provides service and conducts mutual monitoring of computers which constitute the cluster, in the same way as the general cluster system. In the configuration of the example, the cluster control unit 220 conducts mutual communication with the cluster control unit 320 which executes in the LPAR 310 to monitor the operation situation. If the cluster control unit 320 on the backup node detects an abnormality in the primary node, then failover is executed by control of the cluster control unit 320 and the LPAR 310 becomes the primary node.

The cluster control unit 220 waits for a cluster control request from the OS 230 or the data processing program 211 as well.

Operation conducted when a hardware fault has occurred will now be described. The case where the fault is a partial fault and other LPARs can continue execution if only the affected LPAR is stopped will now be described. In the case of a hardware fault which affects all LPARs, execution of all LPARs is stopped and all LPARs which constitute the clusters failover. It is now supposed that a hardware fault which makes impossible for the LPAR 260 to continue execution has occurred.

Figure 5:
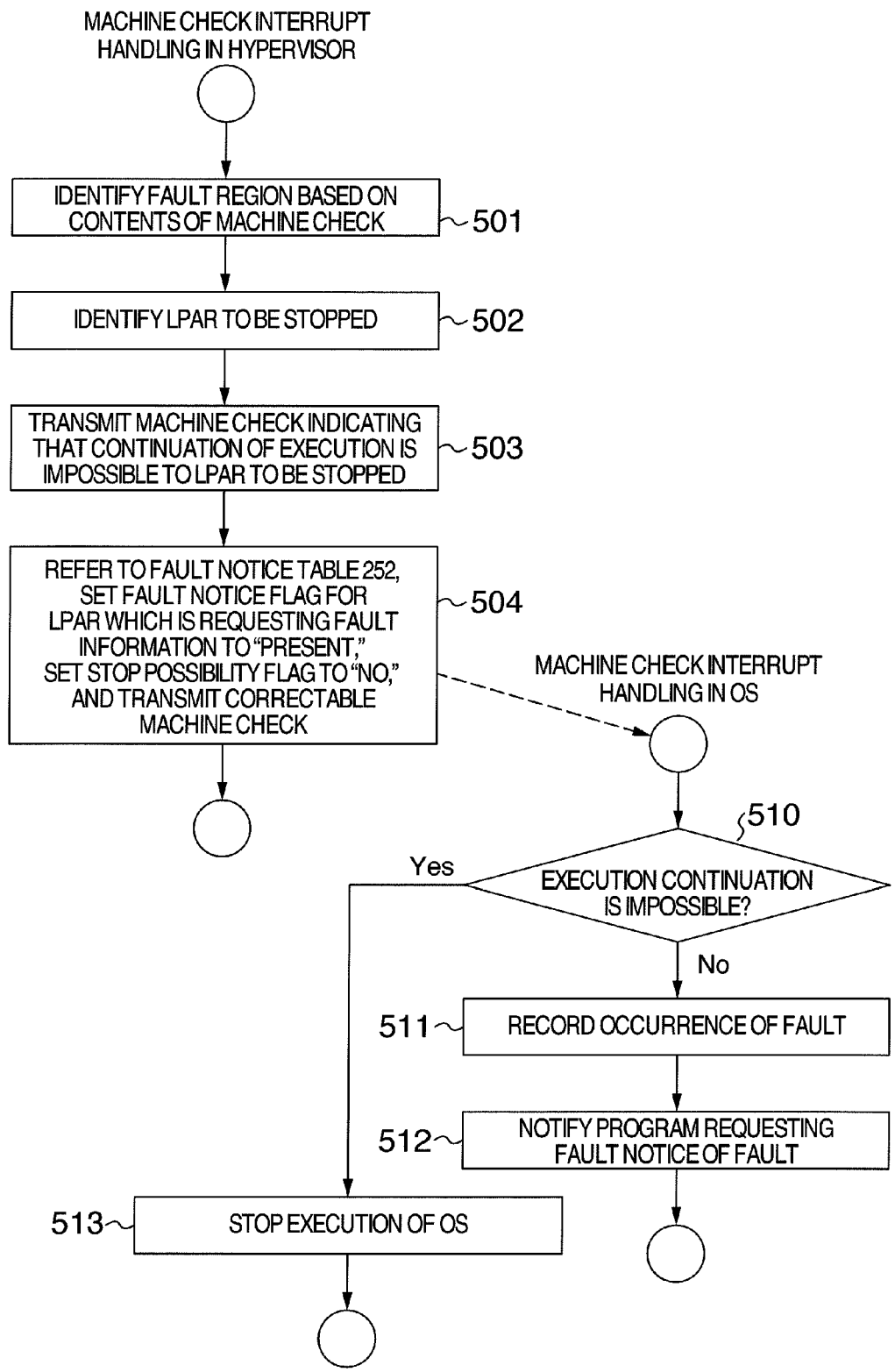
FIG. 5 is a flow chart showing a hardware fault processing procedure in a hypervisor and an OS in an embodiment of the present invention.

FIG. 5 shows a processing flow of the machine check interrupt processing handler 251 in the hypervisor and the machine check interrupt processing handler 231 in the OS 230 at the time when a partial hardware fault has occurred.

If a hardware fault has occurred in the computer 100, a component which has caused the fault transmits a machine check interrupt to the CPUs 101 to 104. A CPU which has caughted the interrupt executes the machine check interrupt processing handler 251 in the hypervisor 250. The machine check interrupt processing handler 251 identifies a fault reason on the basis of contents of the interrupt (step 501), and identifies an LPAR which becomes impossible to execute due to influence of the hardware fault (step 502).

The machine check interrupt processing handler 251 transmits an uncorrectable machine check which indicates that continuation of execution is impossible to the LPAR which is impossible to execute, and causes the execution of the LPAR to be stopped (step 503). At this time, the cluster control unit 220 changes the fault notice flag in the fault notice table 252 to "present" and the stop possibility flag in the fault notice table 252 to "yes."

In this example, the uncorrectable machine check is transmitted from the hypervisor to the LPAR 260. A machine check interrupt processing unit 281 in an OS 280 which executes in the LPAR 260 caught an interrupt transmitted from the machine check interrupt processing handler 251 in the hypervisor, and stops execution of the OS 280.

If the execution of the OS 280 is stopped, then the cluster control unit 370 in the LPAR 360 in the computer 200 which constitutes the cluster with the LPAR 260 detects execution stop of the OS 280 and executes failover. As a result, the LPAR 360 becomes the primary node and a data processing program 361 starts execution. At this time, the cluster control unit 370 has set the stop possibility flag 404 for the LPAR 360 (LPAR4) in the fault notice table 252 to "no" as described above. States of the fault notice table 252 in the computer 200 at this time are shown in 440 in FIG. 12.

Then, the machine check interrupt processing unit 251 refers to the fault notice request flag 402 in the fault notice table 252, sets the fault notice flag 403 for the LPAR which is requesting a fault notice to "present," sets the stop possibility flag 404 to "no," and transmits a machine check (correctable machine check) to notify that execution continuation is possible, but a hardware fault has occurred (step 504).

As shown in 420 in FIG. 4, the LPAR 210 corresponding to the LPAR1 is requesting a notice and the machine check interrupt processing unit 251 transmits the correctable machine check to the LPAR 210. Furthermore, before transmitting the machine check, the interrupt processing handler 251 sets the fault notice flag 403 corresponding to the LPAR 210 in the fault notice table 252 to "present," and sets the stop possibility flag 404 to "no." In the fault notice table 252 at this time, the fault notice flag 403 is "present" and the stop possibility flag 404 is "no" for the LPAR 210 (LPAR1). This state indicates that the LPAR 210 has received a hardware fault notice, but processing required to stop the LPAR 210 associated therewith is not completed. A state of the fault notice table 252 in the computer 100 at this time is shown in 450 in FIG. 12.

Since execution of the LPAR 260 is already stopped, a machine check is not transmitted.

Upon receiving a machine check interrupt, the machine check interrupt processing handler 231 in the OS 230 is started to execute processing described hereafter.

The machine check interrupt processing handler 231 makes a decision whether the caught machine check interrupt is an uncorrectable machine check which indicates that execution continuation is impossible (step 510).

If the machine check is an uncorrectable machine check, execution of the OS 230 is stopped (step 513).

If the machine check is a correctable machine check, then occurrence of a fault is recorded (step 511) and a program which is requesting a fault notice is notified of fault reason (step 512).

In this example, the cluster control unit 220 requests a notice of a machine check interrupt and consequently the OS 230 schedules to cause the fault notice acceptance unit 222 in the cluster control unit 220 to execute. In this example, the machine check notice is transmitted from the machine check interrupt processing handler 231. Alternatively, however, the notice processing may be executed after execution of the machine check interrupt processing handler 231 is completed.

After the machine check interrupt processing is finished, the fault notice acceptance unit 222 is dispatched by the OS 230 to execute. The fault notice acceptance unit 222 sets the request flag 1110 in the failover request table 223 in the cluster control unit 220 to a value indicating "requesting" and sets the uncompleted request flag 1111 to a value indicating "present" (a processing flow is omitted).

Figure 6:
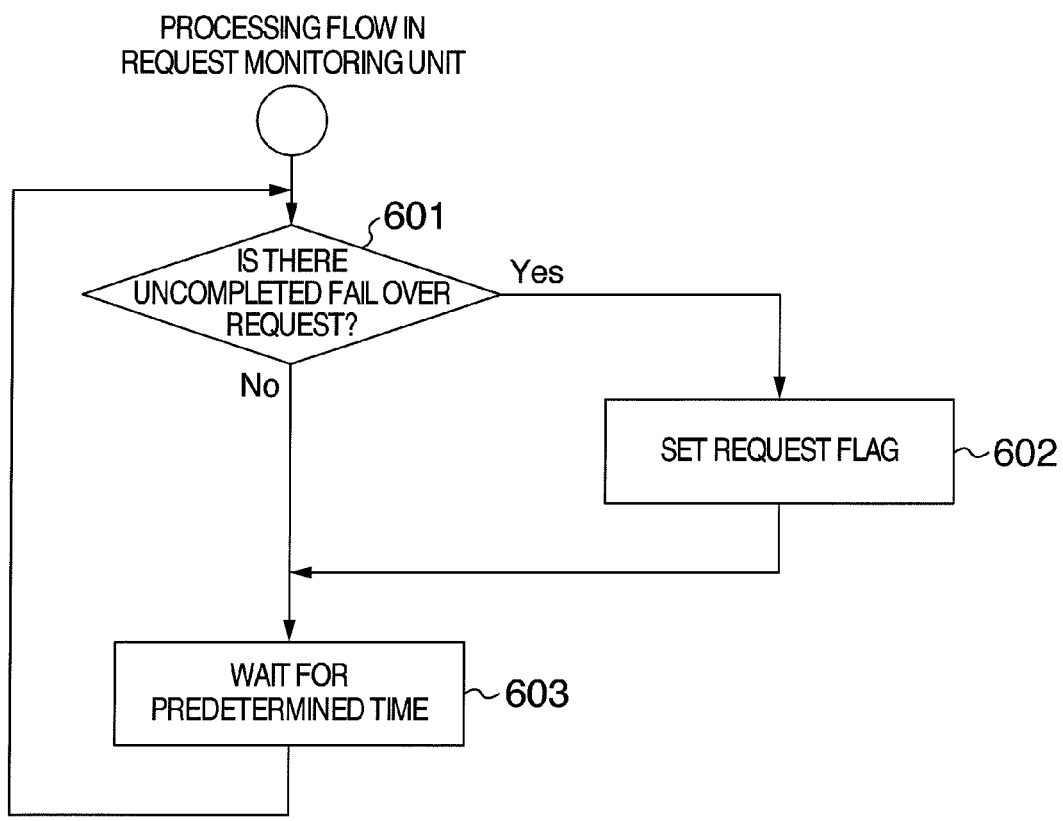
FIG. 6 is a flow chart showing a monitoring procedure of a failover request in a cluster control unit in an embodiment of the present invention.

The request monitoring unit 225 in the cluster control unit 220 periodically executes processing of checking the failover request table 223. FIG. 6 shows its processing flow. The request monitoring unit 225 inspects the uncompleted request flag 1111 in the failover request table 223 and makes a decision whether the failover is not completed although there is a request (step 601).

If so, the request flag 1110 in the failover request table 223 is set to "requesting" again (step 602).

After these kinds of processing, the request monitoring unit 225 waits for a predetermined time (step 603) and repeats check processing from the step 601.

As a result, an uncompleted failover request is reissued every determinate time. Even in a state in which failover cannot be conducted at a time point of a first failover request, therefore, failover processing is re-executed at a certain time point in the future. By the way, the determinate time is set by the user on the basis of an application which is being executed. For example, the determinate time may be 30 seconds.

Figure 7:
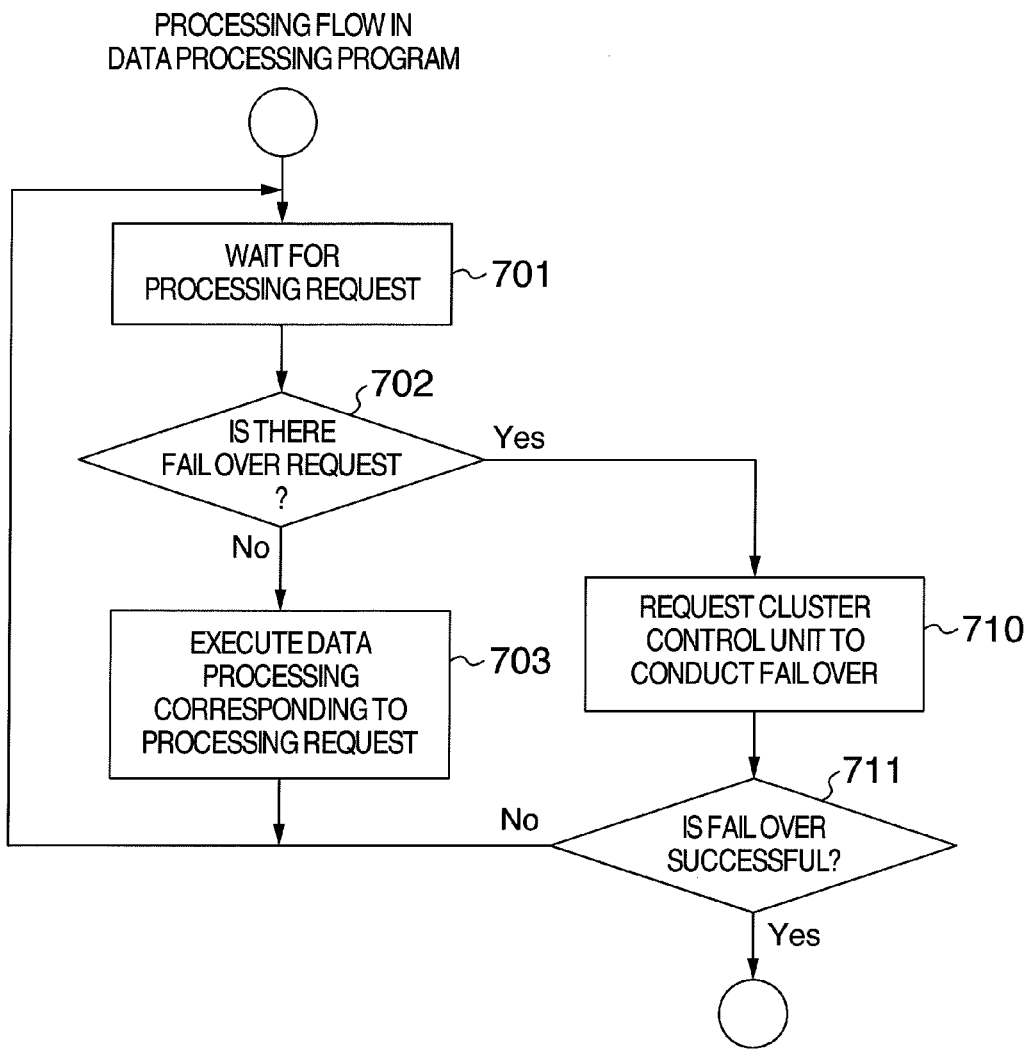
FIG. 7 is a flow chart showing a processing procedure in a data processing program in an embodiment of the present invention.

Processing of the data processing program 211 will now be described. FIG. 7 shows a processing flow of the data processing program 211. The data processing program 211 is basically repetition of accepting a processing request transmitted via a network and execution of data processing corresponding to the processing request.

The data processing program 211 waits for a processing request (step 701). The data processing program 211 waits to time out when predetermined time has elapsed. The step 701 is completed by arrival of a processing request or time out.

The data processing program 211 inquires of the cluster control unit 220 via the cluster control interface 221 whether there is a failover request (step 702). The cluster control unit 220 returns the value of the request flag 1110 in the failover request table 223.

If there is no failover request, then requested data processing is executed (step 703). If the step 701 is completed by time out, however, nothing is done.

After completion of the processing, the data processing program 211 waits for arrival of a processing request again (the step 701).

If there is a failover request, the data processing program 211 requests the cluster control unit 220 to conduct failover (step 710).

After the request, the data processing program 211 waits for completion of failover processing, acquires an execution situation of the failover from the cluster control unit 220, and makes a decision whether the failover is successful (step 711).

If the failover is successful, the data processing program 211 stops execution. If the failover fails, the data processing program 211 waits for arrival of a processing request again (the step 701).

If the failover fails, then failover is requested again at a certain time point in the future by processing in the request monitoring unit 225. Processing may be conducted to forcibly stop the processing of the data processing program 211 at a time point when the failover is successful. In this case, the processing of the data processing program 211 is continued only when the failover fails.

Figure 8:
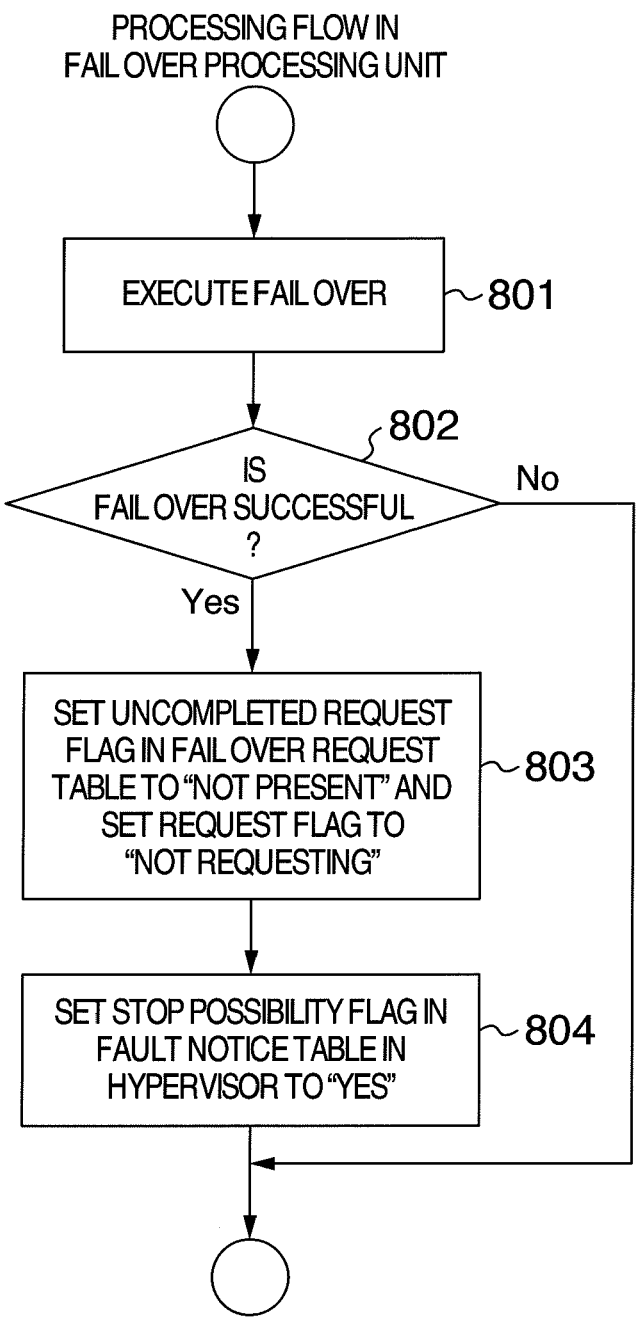
FIG. 8 is a flow chart showing a failover processing procedure in a cluster control unit in an embodiment of the present invention.

FIG. 8 shows a processing flow of the failover processing unit 224 in the cluster control unit 220.

Upon receiving a request from the data processing program 211, the failover processing unit 224 executes failover processing (step 801). If the failover is completed, then the LPAR 310 in the computer 200 becomes the primary node and the data processing program 311 accepts a request and executes data processing.

The failover processing unit 224 makes a decision whether the failover is successful (step 802).

If the failover is successful, then the uncompleted request flag 1111 in the failover request table 223 (FIG. 11) is set to "not present" and the request flag 1110 in the failover request table 223 is also set to "not requesting" (step 803).

In addition, the stop possibility flag 404 in the fault notice table 252 in the hypervisor 250 is set to "yes" (step 804). This is executed via an interface provided by the hypervisor 250. As a result, the entry for the LPAR 210 in the fault notice table 252 becomes "present" in the fault notice flag 403 and "yes" in the stop possibility flag 404. This indicates that a fault is notified of and preparations for stopping in response to the fault notice are ready. States of the fault notice table 252 in the computer 100 at this time are shown in 460 in FIG. 12. As shown in 460, it becomes possible by referring to the fault notice table 252 to easily recognize that the LPAR1 and the LPAR2 executed in the computer 100 can be stopped. Furthermore, states of the fault notice table 252 in the computer 200 are shown in 470 in FIG. 12. Since the LPAR 310 has become the primary node, the stop possibility flag 404 for the LPAR3 is shown to become "no."

By the way, if failover fails, execution in the primary node is continued. The failover is requested again at a later time point.

When a hardware fault has occurred in the computer 100, automatic failover to an LPAR assuming a cluster configuration on hardware which has no relation to the fault, i.e., in which no fault has occurred is conducted and consequently the LPAR 210 becomes the backup node. According to the embodiment described heretofore, therefore, it becomes possible for the operator to execute work for stopping execution of the hardware in which the fault has occurred, in preparation for maintenance work in the future.

According to the present invention, the fault notice table 252 for managing the fault notice request flag 402 and the stop possibility flag 404 is provided in the hypervisor 250 and the hypervisor 250 provides an interface for updating them. As a result, it becomes possible for the hypervisor 250 to notify an LPAR which can continue execution, of fault occurrence when a partial fault has occurred and cause the LPAR to execute processing in preparation for future stop. Furthermore, a program (the cluster control unit 220, in the embodiment) which executes in the LPAR can receive a notice of a partial fault which has no direct relation to execution of itself and execute processing in preparation for system stop at the time of future maintenance (execute failover, in the embodiment). Upon receiving a fault notice, therefore, the LPAR can execute preparations for future maintenance and notify the hypervisor 250 that the preparations have been completed. In the ordinary system, the method for ascertaining whether the LPAR can be stopped depends upon a application which is being executed and consequently individual ascertainment is needed. According to the present embodiment, the hypervisor 250 can retain information for judging whether the whole of the computer 100 can be stopped, regardless of the application which is being executed, and consequently it becomes possible for an operator engaging in maintenance to easily judge whether the computer can be stopped.

Furthermore, it becomes possible to execute failover safely and prepare for maintenance work at some time point between occurrence of a hardware fault and a maintenance time point by combining hardware fault processing with cluster control as in the present embodiment. It is also possible to monitor a notice of a hardware fault externally and have it failovered. Owing to the hypervisor providing the cluster control unit with a trigger of cluster failover, however, a system configuration for monitoring occurrence of a hardware fault from the external node is made unnecessary. Such a monitoring system must have a duplicated configuration to prevent a hardware fault from being overlooked. In the present embodiment, however, they are not needed, resulting in a simple system configuration and high reliability.

Furthermore, since work such as failover is executed automatically, manual work needed at the time of maintenance is reduced, which makes the maintenance operation easy and reliable.

In the present invention, the hardware fault processing is combined with cluster control. However, combination is not restricted to the combination with cluster control. It is possible to execute processing in preparation for future stop as long as a program which receives a notice of a machine check interrupt and updates the fault notice table 252 in the hypervisor 250 executes.

<Embodiment 2>

Figure 9:
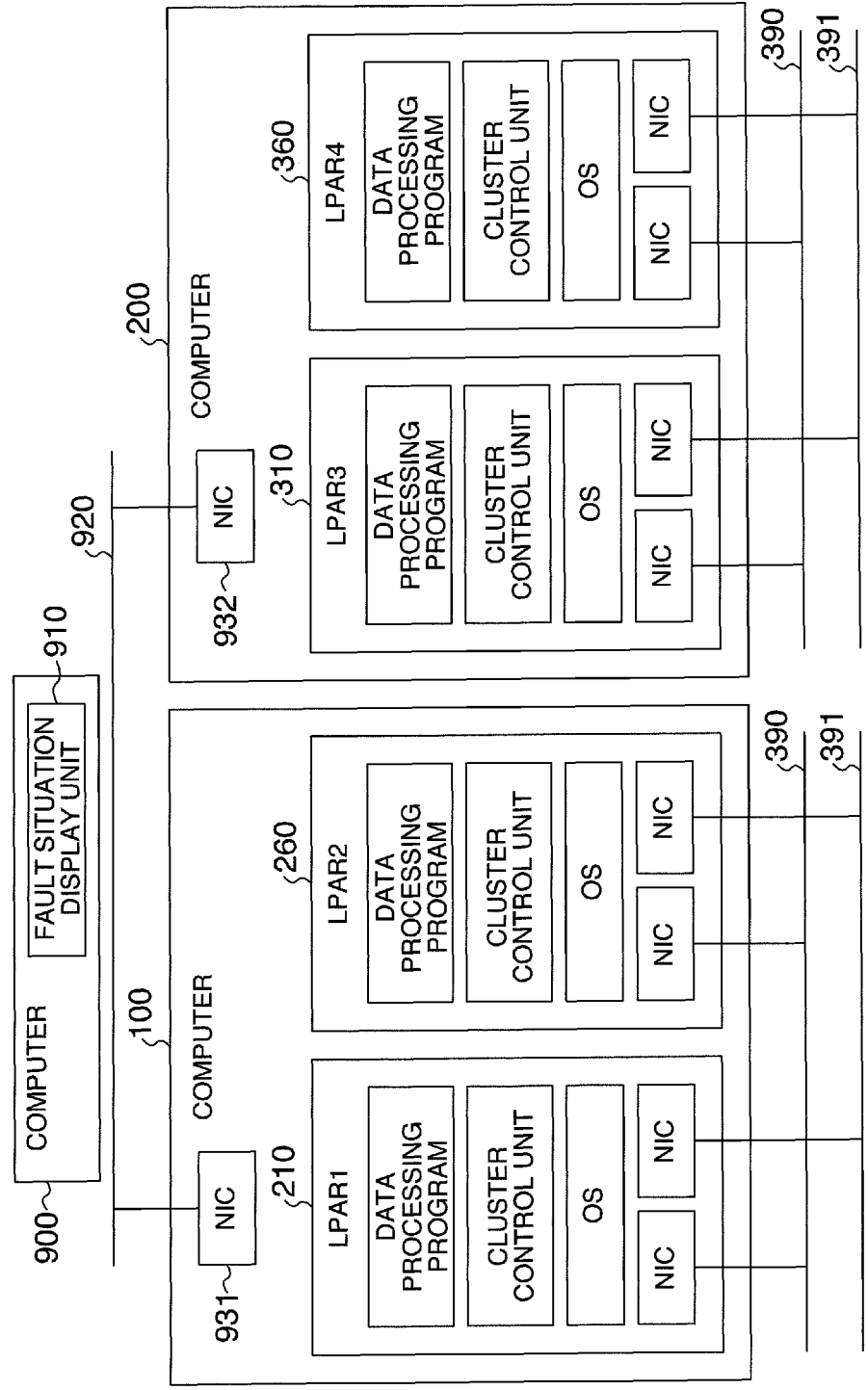
FIG. 9 is a diagram showing a system configuration in an embodiment of the present invention.

A second computer system according to the present invention will now be described. FIG. 9 is a system configuration diagram of an embodiment 2 according to the present invention.

In the embodiment 2, a computer 900 for monitoring the operation states of the computer 100 and the computer 200 is added to the system configuration in the embodiment 1. A NIC 931 and a NIC 932 are mounted respectively on the computer 100 and the computer 200, and are connected to the computer 900 via a network 920. It is made possible to refer to an interface of the hypervisor 250 via the network 920 and acquire contents of the fault notice table 252.

The computer 900 is a computer having a configuration similar to that shown in FIG. 1. In the computer 900, a fault status display unit 910 is executing. The fault status display unit 910 acquires information from computers to be managed and displays the information. It is now supposed that the computer 100 and the computer 200 have been registered as objects of the management. In particular, the fault status display unit 910 acquires states of the fault notice tables 252 from the hypervisors in the computer 100 and the computer 200 and displays the states. As a result, it is possible to make a decision easily whether a hardware fault which allows continuation of execution has occurred and stop preparation processing corresponding to it has been executed.

FIG. 10 shows an example of display of a fault status. This is an example showing a state after failover of the LPAR 210 is completed in the embodiment 1. This display is constituted on the basis of the fault notice table 460 of the computer 100 and the fault notice table 470 of the computer 200 shown in FIG. 12. Hereafter, a constituting method of contents of this display will be described.

The fault status display unit 910 which creates the view shown in FIG. 10 acquires an LPAR name 1001 and an operation situation 1002 of the computer 100 corresponding to the computer A from the hypervisor 250. These kinds of information are supposed to be acquired from the hypervisor 250 as management information. The fault status display unit 910 acquires contents of the fault notice table 252 concerning an LPAR in operation from the hypervisor. Specifically, the fault status display unit 910 displays a value acquired from the fault notice flag 403 in the fault notice table 252 as contents of a fault notice 1003 and displays a value acquired from the stop possibility flag 404 in the fault notice table 252 as contents of a stop possibility 1004. In this example, the LPAR 260 (LPAR2) is in the stop state and consequently information of the LPAR 210 (LPAR1) is acquired and showed. As for information of the LPAR in the stop state, only the LPAR name and operation situation are displayed and other information is not showed.

Information of the computer 200 corresponding to the computer B is acquired and showed in the same way. Specifically, information of the LPAR 310 (LPAR3) and the LPAR 360 (LPAR4) is acquired, and an LPAR name 1011, an operation situation 1012, a fault notice 1013, and a stop possibility 1014 are showed.

In the fault management table 460 shown in FIG. 12, the fault notice flag 403 for the LPAR1 is "present" and the stop possibility flag 404 is "yes." Therefore, the fault status display unit 910 shows "present" in the fault notice 1003 for the computer 100 and shows "yes" in the stop possibility 1004. The fault status display unit 910 acquires contents of the fault notice table 470 for the computer 200 as well and shows information.

In this example, the computer A corresponds to the computer 100 and the computer B corresponds to the computer 200. It is shows that the LPAR1 is executing in the computer A, but the LPAR1 receives a fault notice and in a stoppable state and the LPAR2 stops execution. Furthermore, it is showed that both LPARs 3 and 4 in the computer B are executing.

In the maintenance work, a screen display 1000 is referred to. It can be judged through the screen that in the computer A the LPAR1 is executing, but the LPAR1 can be stopped.

Even if there is an LPAR which continues execution regardless of a partial fault in hardware, it becomes possible to make a decision easily whether the LPAR is in a stoppable state at a time point of maintenance as described heretofore. This is because management software such as the cluster control unit 220 which executes in the LPAR can set a stop possibility state of the LPAR in the fault notice table 252 in the hypervisor 250 in cooperation with the hypervisor 250 by using the interface provided by the hypervisor.

In general, applications running on LPARs are unrelated systems. Only a manager of a system (not an operator) can make a decision whether the application can be stopped. According to the present invention, it is possible to cause an LPAR which continues execution regardless of a partial fault to execute stop preparations directed to maintenance work and ascertain the situation of preparation processing easily. As a result, work for stopping the computer is facilitated when replacing a faulty part.

In the present embodiment, the data processing program 211 and the cluster control unit 220 cooperate and execute the failover. Alternatively, however, the cluster control unit 220 may start the failover singly.

In the foregoing embodiments, the data processing program 211 is caused to judge execution timing of failover of the cluster. Alternatively, however, the hypervisor may monitor the operation situation of the LPAR and cause the cluster control unit 220 to start failover. For example, it is also possible to find an idle state of an LPAR and execute failover.

The foregoing embodiments have been described supposing logical partitioning. In the case where a virtualization mechanism has a function corresponding to a partial fault, however, it may be supposed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for processing a fault for use in a virtual computer system having a plurality of Logical PARtitions (LPAR)s generated on a first physical computer comprising a first hypervisor and a second physical computer comprising a second hypervisor, wherein a first and second LPAR constitute a first cluster, wherein a third and fourth LPAR constitute a second cluster, wherein the second LPAR comprises a first cluster control unit, and wherein the third LPAR comprises a second cluster control unit, the method comprising:
  determining, by the first hypervisor, in response to an occurrence of a fault in the first physical computer, whether one of the plurality of LPARs is available to continue execution on the first physical computer;
  stopping, by the first hypervisor, on a condition that one of the plurality of LPARs is not available to continue execution, a first LPAR that is not available to continue execution and causing the first cluster control unit in the second LPAR that is generated on the second physical computer to conduct a first failover of the first LPAR to the second LPAR; and
  conducting, by the second hypervisor, on a condition that one of the plurality of LPARs is available to continue execution by causing the first cluster control unit to conduct a second failover to the fourth LPAR, wherein the fourth LPAR is available to continue execution to conduct the second failover of the third LPAR to the fourth LPAR, wherein on a condition that the first and second hypervisors have fault notice information, the fault notice information is used to determine whether a fault notice request is present for every LPAR and is used to determine whether the LPAR can be stopped after failover based on a fault that does not affect execution of the LPARs,
  the first hypervisor refers to fault notice information the first hypervisor has, and if there is a request for a fault notice from the third LPAR that is available to continue execution, the first hypervisor transmits the fault notice to the third LPAR, and
  on a condition that the second cluster control unit has received the fault notice, has failover request information to manage a situation of the second failover, and sets presence of a request for the second failover in the failover request information, the second cluster control unit refers to the failover request information, and on a condition that there is the failover request, the second cluster control unit conducts the second failover, and
  upon completion of the second failover, the second cluster control unit sets a stop possibility for the third LPAR in the fault notice information in the first hypervisor to "possible" after the second failover.

2. The fault processing method according to claim 1, wherein
  the virtual computer system comprises a fault situation display unit,
  the fault situation display unit displays an operation situation and a stop possibility every LPAR included in the system, and
  the stop possibility displayed in the fault situation display unit is based on stop ability of the LPAR after failover managed by the fault notice information.

3. The fault processing method according to claim 1, wherein the second cluster control unit conducts reference to the failover request information every predetermined time period.

4. The fault processing method according to claim 1, wherein
  the first hypervisor in the first physical computer and the second hypervisor in the second physical computer have interfaces to register that an LPAR requests a notice of a fault for which execution is to be continued, and
  the first hypervisor in the first physical computer and the second hypervisor in the second physical computer notify an LPAR that has requested a notice of a fault for which execution is to be continued in accordance with a registration situation through the interfaces.

5. The fault processing method according to claim 1, wherein
  the first hypervisor in the first physical computer and the second hypervisor in the second physical computer have interfaces to notify that the third LPAR has executed the second failover,
  wherein at least one of the first hypervisor and the second hypervisor retains a notice situation of processing coping with a fault of LPARs, and
  wherein at least one of the first hypervisor and the second hypervisor has an interface to acquire the notice situation.

6. The fault processing method according to claim 5, comprising a procedure and a device to acquire and display a situation of coping with a fault retained by at least one of the first hypervisor and the second hypervisor.

7. The fault processing method according to claim 5, comprising:
  a procedure for receiving a notice of a fault allowing continued execution from at least one of the first hypervisor and the second hypervisor and executing system changeover; and
  a procedure for notifying that processing for coping with a fault has been executed after completion of the system changeover, via an interface of at least one of the first hypervisor and the second hypervisor,
  wherein a completion situation of the system changeover is acquired from at least one of the first hypervisor and the second hypervisor.

8. A virtual computer system comprising:
  a first physical computer and a second physical computer configured to generate a plurality of Logical PARtitions (LPAR)s, wherein the first physical computer comprises a first hypervisor and a second physical computer comprises a second hypervisor, wherein a first and second LPAR constitute a first cluster and wherein a third and fourth LPAR constitute a second cluster, and wherein the second LPAR comprises a first cluster control unit and the third LPAR comprises a second cluster control unit;
  wherein the first hypervisor in the first physical computer, upon an occurrence of a fault in the first physical computer, is configured to determine whether one of the plurality of LPARs is available to continue execution on the first physical computer, and
  wherein the first hypervisor, on a condition that one of the plurality of LPARs is not available to continue execution, is configured to stop the first LPAR that is not available to continue execution, and wherein the second physical computer is configured to conduct a first failover of the first LPAR to the second LPAR, and wherein the second physical computer, on a condition that one of the plurality of LPARs is available to continue execution to cause the first cluster control unit to conduct a second failover to the fourth LPAR, wherein the fourth LPAR is available to continue execution and which is generated on the second physical computer, wherein the second hypervisor is configured to conduct a second failover of the third LPAR to the fourth LPAR, wherein on a condition that the first and second hypervisors have fault notice information, the fault notice information is used to determine whether a fault notice request is present for every LPAR and is used to determine whether the LPAR can be stopped after failover based on a fault that does not affect execution of the LPARs, the first hypervisor refers to fault notice information the first hypervisor has, and if there is a request for a fault notice from the third LPAR that is available to continue execution, the first hypervisor transmits the fault notice to the third LPAR, and on a condition that the second cluster control unit has received the fault notice, has failover request information to manage a situation of the second failover, and sets presence of a request for the second failover in the failover request information, the second cluster control unit refers to the failover request information, and on a condition that there is the failover request, the second cluster control unit conducts the second failover, and upon completion of the second failover, the second cluster control unit sets a stop possibility for the third LPAR in the fault notice information in the first hypervisor after the second failover to "possible".

9. The virtual computer system according to claim 8, wherein the virtual computer system comprises a fault situation display unit, the fault situation display unit displays an operation situation and a stop possibility every LPAR included in the system, and the stop possibility displayed in the fault situation display unit is based on stop ability of the LPAR after failover managed by the fault notice information.

10. The virtual computer system according to claim 8, wherein the second cluster control unit conducts reference to the failover request information for every predetermined time period.

11. A physical computer configured to generate a plurality of Logical PARtitions (LPAR)s including a first LPAR and a second LPAR, wherein the first and second LPAR constitute a cluster, the physical computer comprising:

a first hypervisor and a second hypervisor configured to control the plurality of LPARs, wherein the first and second hypervisors have fault notice information, the fault notice information is used to determine whether there is a request of a fault notice for every LPAR and is used to determine whether the LPAR can be stopped after failover based on a fault that does not affect execution of the LPARs, wherein upon occurrence of a fault, the first hypervisor referring to the fault notice information is configured to transmit a fault notice to an LPAR to request a notice of the fault, and determine whether there is an LPAR that is available to continue execution among the plurality of LPARs, wherein on a condition that an LPAR is not available to continue execution, the first hypervisor is configured to stop the first LPAR that is not available to continue execution and the first LPAR is failed over to a second LPAR, wherein on a condition that an LPAR is available to continue execution, a third LPAR that is available to continue execution is failed over to a fourth LPAR, wherein the third and fourth LPAR constitute a cluster, and upon completion of the failover of the LPARs, a cluster control unit in the LPAR that has received the fault notice setting is configured to stop a possibility for the LPAR in the fault notice information to "possible" after failover.

* * * * *